W. D. NICHOLS.
Wind-Mills.
No. 139,473.
Patented June 3, 1873.
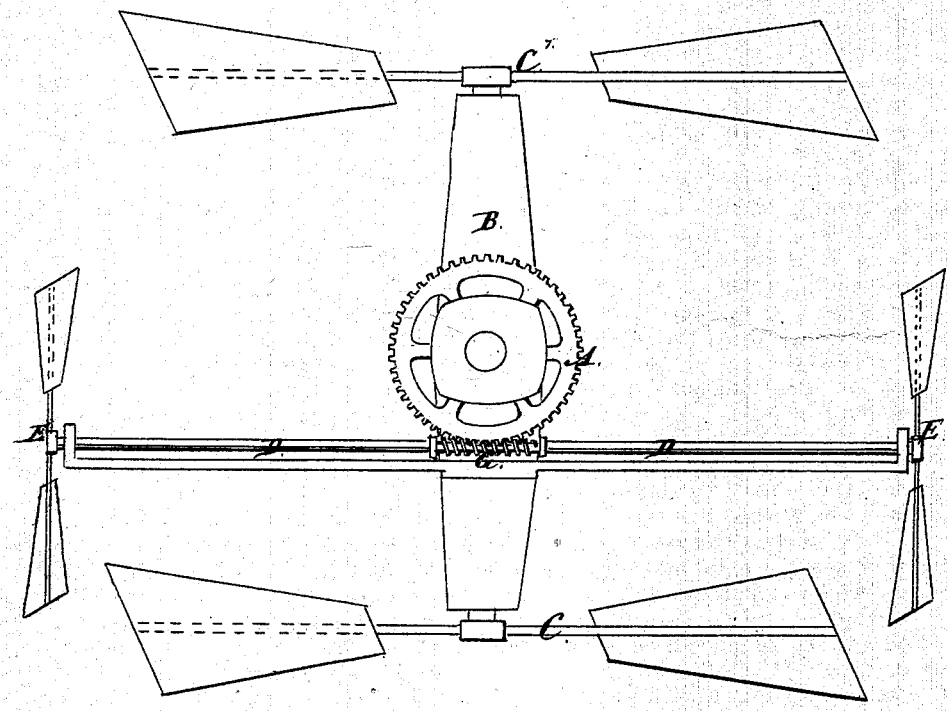

UNITED STATES PATENT OFFICE.

WILLIAM D. NICHOLS, OF BATAVIA, ILLINOIS.

IMPROVEMENT IN WINDMILLS.

Specification forming part of Letters Patent No. 139,473, dated June 3, 1873; application filed April 21, 1873.

*To all whom it may concern:*

Be it known that I, WILLIAM D. NICHOLS, of Batavia, in the county of Kane and State of Illinois, have invented certain Improvements in Windmills, of which the following is a specification:

This invention relates to an improvement upon the double-header windmill heretofore patented to me.

The object of this improvement is to furnish a means of turning the mill into the wind automatically by the action of the wind itself; and the invention consists in mounting upon the tower which sustains the mill a stationary horizontal screw-gear wheel, and upon the movable carriage which carries the two large wind-wheels a cross-shaft bearing two small wind-wheels, one at each end, placed at right angles to the plane of the large wheels. Upon the said cross-shaft is a worm-pinion, which takes into the stationary screw-gear wheel, and causes the entire carriage to revolve around said wheel when the wind acts upon the small wind-wheels, so that when the wind changes and veers around at right angles to the large wheels the small wheels, being then full in the wind, operate to turn the mill again to the wind, all of which will be fully hereinafter explained.

In the accompanying drawing, which forms a part of this specification, a view from below of a windmill made according to this invention is represented.

In said drawing, A represents a stationary screw-gear wheel, which is secured horizontally upon the top of the windmill-tower. Above this rides the pivoted carriage B, of the usual construction in double-header mills. This carriage supports two large vertical wind-wheels, C C′, one at each end, which operate jointly together. Upon this pivoted carriage is journaled a transverse shaft, D, which extends laterally to both sides of the mill parallel to the plane of the wind-wheels C C′, and reaches out slightly beyond the periphery of said wheels. Upon each end of this transverse shaft D is borne a small wind-wheel, E, and to the center of said shaft is attached a worm-pinion, G, which takes into the stationary gear-wheel A.

The mill, when in operation, stands with the head-wheel C facing the wind and the tail-wheel C′ behind it and parallel therewith. The current of wind operates both wheels at the same time, the first by the square current, the last by lateral converging currents added to the wind which escapes through the first wheel.

The great difficulty with these double mills has been to keep them steadily in the wind. Tail-vanes and various contrivances for this purpose have been used with more or less success; but the contrivance which is herein described not only keeps the mill-head to the wind, but holds it firmly against any swaying or alternate vibration, which is commonly caused by the action of the wind upon the large wind-wheels.

The transverse shaft D, as will be perceived, is placed in front of the screw-gear wheel.

When the wind shifts in either direction it strikes more or less squarely the small wind-wheels, the vanes of which are both slanted in the same direction, and in such direction as to cause them to revolve in a proper course to actuate through the worm-pinion upon the stationary gear-wheel to cause the large wind-wheels to turn again to the wind, and at the same time the small wheels turn out of the wind and cease revolving. The wind acting upon the large wheels alone cannot turn the carriage, because the screw-gear will only operate one way.

I am well aware that it has been a common custom to employ a single small wheel placed at right angles to the large wheel of the common windmill to serve in lieu of a tail-vane by actuating a gearing to revolve the top of the tower; and I lay no claim to the invention of such, as no such contrivance could be successfully applied to my double-header mill. Moreover, by employing the transverse shaft D with two small wind-wheels, I am enabled to apply their force directly to the work without the intervention of a train of gearing, as has been heretofore found necessary, whereby I simplify and cheapen the cost of the mechanism, which may be applied equally well to double or single mills.

In view of the premises, that which I claim as new, and desire hereby to secure, is—

1. The combination, with a double-header mill, C C', of a stationary gear-wheel, A, and the two small wind-wheels, E E, borne upon a transverse shaft, D, which is furnished with a worm-pinion, G, all constructed and operating substantially as specified.

2. The combination of the transverse shaft D provided with two small wind-wheels, E E, the worm-pinion G, and stationary gear-wheel A, substantially as specified.

WILLIAM D. NICHOLS.

Witnesses:

THOMAS SNOW,
E. H. GRAVES.